US010580010B2

(12) United States Patent
Brondstetter et al.

(10) Patent No.: US 10,580,010 B2
(45) Date of Patent: Mar. 3, 2020

(54) METHOD, SYSTEM AND PROGRAM PRODUCT FOR MEASURING CUSTOMER SATISFACTION AND APPLYING POST CONCERN RESOLUTION

(76) Inventors: David Brondstetter, Mercer Island, WA (US); Timothy Fiorito, Seattle, WA (US)

( * ) Notice: Subject to any disclaimer, the term of this patent is extended or adjusted under 35 U.S.C. 154(b) by 502 days.

(21) Appl. No.: 13/481,417

(22) Filed: May 25, 2012

(65) Prior Publication Data

US 2012/0303545 A1 Nov. 29, 2012

Related U.S. Application Data

(60) Provisional application No. 61/491,098, filed on May 27, 2011.

(51) Int. Cl.
*G06Q 10/00* (2012.01)
*G06Q 30/00* (2012.01)

(52) U.S. Cl.
CPC .................................... *G06Q 30/00* (2013.01)

(58) Field of Classification Search
CPC ........ G06Q 30/02; G06Q 10/10; G06Q 10/06; G06Q 10/00; G06Q 30/0203; G06Q 30/06; G06Q 50/22; G06Q 10/0631; G06Q 30/016; G06Q 30/0601; G06Q 40/08; G06Q 30/0282; G06Q 40/12; G06Q 30/0283; G06Q 30/0276; G06Q 30/0629; G06Q 30/0631; G06Q 30/0641; G06Q 30/0643; G06Q 10/101; G06Q 10/107; G06Q 20/12; G06Q 20/387; G06Q 30/0214; G06Q 30/0217; G06Q 30/0222; G06Q 30/0229; G06Q 30/0232; G06Q 30/0241; G06Q 30/0254; G06Q 10/06375; G06Q 10/06393; G06Q 10/087; G06Q 10/1095; G06Q 20/20; G06Q 30/01; G06Q 30/018; G06Q 30/0204; G06Q 30/0208; G06Q 30/0215; G06Q 30/0242; G06Q 30/0251; G06Q 30/0281; G06Q 30/04; G06Q 40/04; G06Q 40/06; G06Q 40/10; G06Q 40/125
See application file for complete search history.

(56) References Cited

U.S. PATENT DOCUMENTS 6,405,177 B1 6/2002 DiMattina
7,860,755 B2 12/2010 Warner
(Continued)

*Primary Examiner* — Gabrielle A McCormick
(74) *Attorney, Agent, or Firm* — Boswell IP LAW; James Mason Boswell

(57) ABSTRACT

A method, system and program product comprises receiving a request for a review of a product or service purchased from a business. Said review is transmitted to be recorded on a server system. Said server system is operable to process said review to determine if a sentiment of said review is below a predetermined threshold. Said server system is further operable to prompt said business to resolve one or more concerns of said review. A concern resolution is received from said business. An outline of said concern resolution is recorded on said server system. A request to submit a follow up review of said concern resolution is received. Said follow up review is recorded on said server system. Said server system is operable to process said follow up review in which said review, said outline of said concern resolution and said follow up review are viewable on a website.

20 Claims, 5 Drawing Sheets

(56) References Cited

U.S. PATENT DOCUMENTS

| | | | | |
|---|---|---|---|---|
| 2001/0039523 | A1* | 11/2001 | Iwamoto | G06Q 40/00 705/35 |
| 2004/0107363 | A1 | 6/2004 | Monteverde | |
| 2004/0162778 | A1 | 8/2004 | Kramer et al. | |
| 2004/0254850 | A1 | 12/2004 | Head | |
| 2005/0240464 | A1* | 10/2005 | Borovich | G06Q 10/06375 705/7.32 |
| 2006/0253316 | A1* | 11/2006 | Blackshaw et al. | 705/10 |
| 2007/0078669 | A1 | 4/2007 | Dave et al. | |
| 2007/0288323 | A1 | 12/2007 | Halevy | |
| 2008/0270209 | A1 | 10/2008 | Mauseth et al. | |
| 2009/0248495 | A1 | 10/2009 | Hueter et al. | |
| 2010/0241501 | A1 | 9/2010 | Marshall | |
| 2010/0332287 | A1* | 12/2010 | Gates | G06F 17/277 705/7.32 |
| 2011/0178885 | A1* | 7/2011 | Xiong | 705/16 |

* cited by examiner

METHOD, SYSTEM AND PROGRAM PRODUCT FOR MEASURING CUSTOMER SATISFACTION AND APPLYING POST CONCERN RESOLUTION

CROSS-REFERENCE TO RELATED APPLICATIONS

The present Utility patent application claims priority benefit of the [U.S. provisional application for patent Ser. No. 61/491,098 entitled "System and Method for Measuring Concern Resolution Efficacy", filed on 27, May 2011, under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to concern resolution. More particularly, one or more embodiments of the invention relate to measuring customer satisfaction and applying a post concern resolution method and system.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that companies have always tried to receive feedback from consumers. The feedback was analyzed for multiple reasons, including: concern resolution efficacy, providing better future products and services for the consumer; understanding the consumer's needs; verifying product and service quality; and strategizing marketing efforts.

Typically, gathering consumer reviews involved creating a method for gathering the customer feedback, managing good relationships with the consumers, and extracting and interpreting meaningful market research information from the consumers. The means by which these steps were accomplished varied. One method included a review website on which reviews could be posted about people, businesses, products, or services. The review websites gathered reviews from site users or employed professional writers to author reviews on the topic of concern for the site.

Typically, companies utilized a search engine for consumer product reviews, plus a database of reports on consumer products and services, published and updated only online. The companies did not review products and services directly, nor did the review site publish reviews from the consumers. Rather, paid writers reviewed the print and online reviews of products and services, using a set of objective, published ratings criteria. The companies then used this data to address concern resolution.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1A:
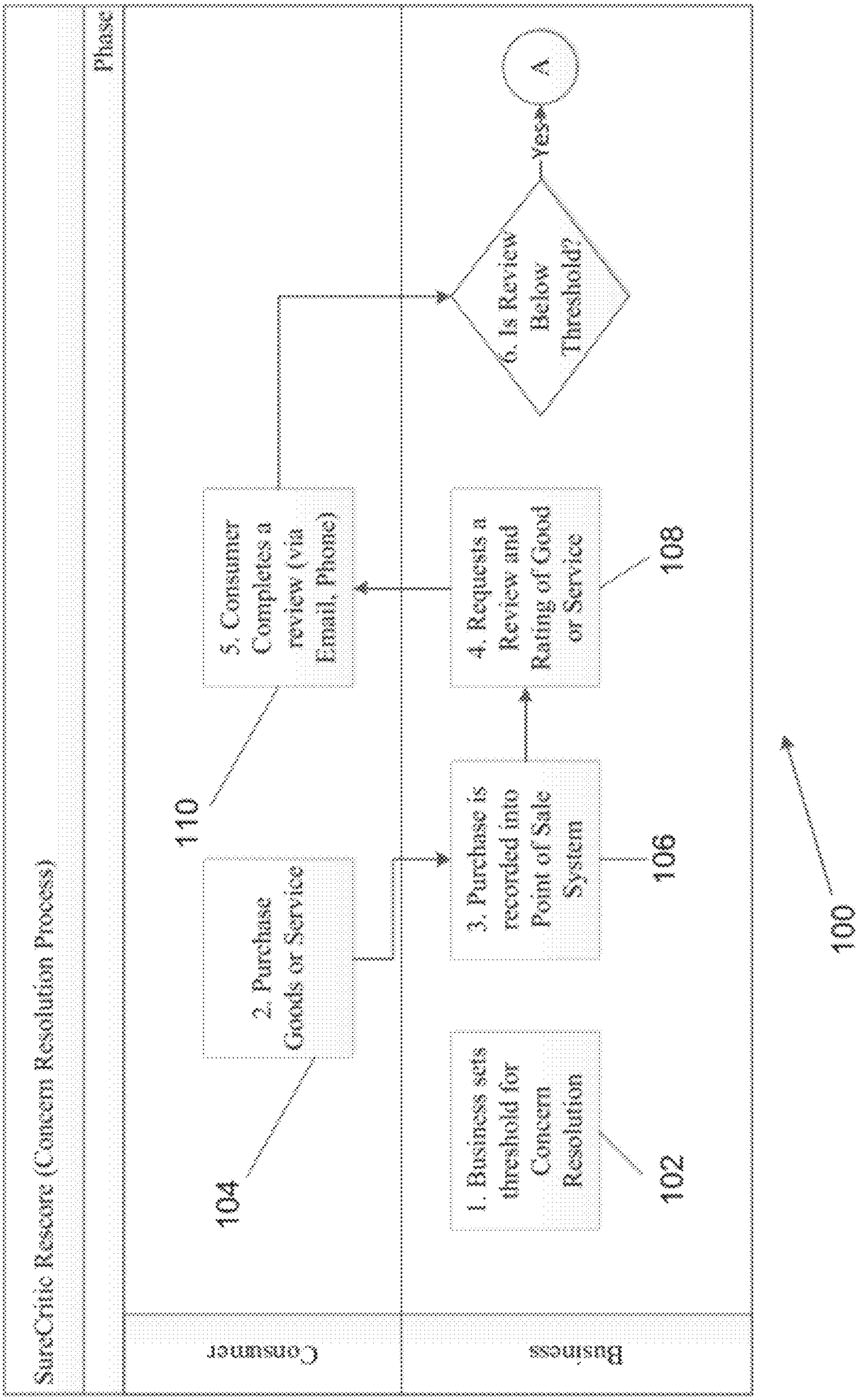
FIG. 1 illustrates an exemplary flowchart that illustrates a process for the system and method for measuring concern resolution efficacy, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

The present invention will now be described in detail with reference to embodiments thereof as illustrated in the accompanying drawings.

In some embodiments, the system and method for measuring concern resolution efficacy 100 provides a post concern resolution rating and review score process that allows a business to accept ratings and reviews from a consumer, initiate some form of concern resolution activity, and finally post concern resolution ratings and a follow up review for the consumer public to view. In this manner, the system and method for measuring concern resolution efficacy may provide a chronological depiction of the concern resolution efficacy of the business. In some embodiments, the business may redeem a reputation after a negative original review from the consumer. The consumer may also benefit because the business desires a positive follow up review from the consumer, and will attempt to resolve the consumer concern to achieve the positive follow up review.

In some embodiments, the review of the product and service, and the subsequent concern resolution process may be depicted as a chronological picture, including, without limitations, 1) the consumer concern through the original review, 2) the business response, and 3) the consumer satisfaction with the business response. In some embodiments, the chronological picture may be depicted, without limitation, graphically, statistically, with a star rating system, and with text. The website may include ratings, reviews, comments, and resolutions from all parties throughout the process. In this manner the consumer public may view the business concern resolution efficacy. The business may also explain the situation pertaining to the original revew by the consumer by responding to the original review and appending a response in the form of a viewable business comment to the original review. After the business performs concern resolution, the consumer who gave the original review is asked if the concern resolution was satisfactory and a follow up review is requested by the business in the form of a follow up rating. The follow up rating, which in some embodiments may be named "ReScore", is then appended to the original review and business comments for the consumer public to view on a website.

In some embodiments, after the consumer conducts a transaction with the business, the resolution efficacy method allows the business to collect reviews from the consumer by asking questions of satisfaction from a survey/review request from an event including, without limitations, a transaction at the place of business, the internet, or a telephone survey, and then presenting the original review in the public domain. Those skilled in the art, in light of the present teachings, will recognize that collecting the original reviews does not require technology, but technology may facilitate the collection of original reviews, analyze and calculate the original reviews, and distribute the results. In some embodiments, the original reviews may be collected through a live voice telephone survey, Interactive Voice Recording (IVR), and Short Code Messaging Service (SMS) response. The results of the surveys may be manually or automatically input into a database or database server. However, other embodiments for receiving consumer reviews through other channels may include, without limitation, review cards, website surveys, door-to-door surveys, and telephone surveys. In various embodiments, computer systems are utilized to collect Individual Post Concern Resolution Ratings Score and Recommendation 14 and the Individual Post Concern Resolution Comments 16 to store the information into a database or database server. These methods may include, without limitation, email, a Web.-based form accessed via a Web. browser, a native client application running on or within in the operating system of the device (i.e. without limitation, Microsoft Windows provided by Microsoft Corporation, Apple OS X provided by Apple Inc., Apple iOS Provided by Apple Inc., Google Chrome provided by Google Inc., Google Android provided by Google Inc., Microsoft Windows Mobile provided by the Microsoft Corporation), and computer based social networks including, without limitation, Twitter and Facebook.

In some embodiments, after the business receives the reviews, the business may then actuate resolution efficacy to resolve any issues with the consumer. The business may also communicate freely with the consumer to ensure that both parties are aware of the circumstances regarding the review. The full record of resolution activities and communications may involve calculations of the original and follow up review details, which may include an absolute or summary. In some embodiments, the summary may represent aggregation and averages, which may include, without limitation, Likert Score Average; Star Rating Comparison; Improvement? Yes/No selections; and Thumbs up/Thumbs down comparison. In some embodiments, the initial review may be compared with the follow up review to create comparative and empirical data that quantifies the ability of the business to resolve the consumer concerns. In some embodiments, the review utilizes statistical formulas and techniques to compare the initial review against the follow up review.

Those skilled in the art, in light of the present teachings, will recognize that one possible comparison method may include, without limitation, a Likert Score Average. The Likert Score Average utilizes an existing review score average and is based on delta between an original rating, and a follow up rating. The Likert score displays an average raw data in side by side comparison. For example, without limitation, 2 star original rating versus 4 star follow up rating may demonstrate, without limitation, percent improvement from original rating, ratio improvement from original rating, and textual opinion. The Likert Score Average may also be represented with an absolute rating. For example, without limitation, if the original rating was 1 star and the follow up rating improved to 10 stars, then an absolute improvement number would be 9.

In some embodiments, the resolution efficacy method allows the business to request follow up reviews from the consumer after concern resolution efforts and appending a business comment. In some embodiments, if the business resolves the consumer concern and would like to ask the consumer to give a follow up review and possible a new rating based on their attempt to resolve their concern, the business may contact the consumer to request this. In some embodiments, the business may request that the consumer perform the follow up review and rating through a computer or a website. Those skilled in the art, in light of the present teachings, will recognize that one possible follow up review method may be named "ReScore". To initiate the follow up review, the business may click the "ReScore" button in an administration section of the website. Some other embodiments may allow a "ReScore" to be automatically generated upon previous action or business rule configuration. In a non-limiting example, once a comment has been entered, automate a "ReScore" request. Once "ReScore" is selected, the business automatically recontacts the consumer and requests a new star rating and new comments based on the follow up utilized to resolve the consumer concern. In some embodiments, the ReScore star rating and review may append directly to the original review along with the businesses comments about the review. In some embodiments, the ReScore may be collected and rendered through a computer system or web site, or through manual means such as paper. In more detail regarding web site, specifically a web-based form accessed through a Web browser, a native client application running on or within in the operating system of the device (i.e., without limitation, Microsoft Windows provided Microsoft Corporation, Apple OS X provide by Apple Inc, Apple iOS Provided by Apple Inc, Google Chrome provided by Google Inc, Google Android provided by Google Inc, Microsoft Windows Mobile provided by the Microsoft Corporation), computer based social networks (such as Twitter and Facebook). In some embodiments, the computing system used for the follow up review may include multiple interacting computing systems or devices, and may be connected to other devices, including through one or more networks such as the Internet or through the World Wide Web. More generally, a "client" or "server" computing system or device may comprise any combination of hardware or software that can interact in the manners described, including (without limitation) desktop or other computers, database, database server notebooks, network devices, PDAs, tablets, mobile phones, electronic organizers, Internet appliances, television-based systems (e.g., game systems, set-top boxes and/or personal/digital video recorders), and various other consumer products that include appropriate communication and computing capabilities.

Those skilled in the art, in light of the present teachings, will recognize that methods to initiate and collect the follow-up information and then to calculate the post concern resolution value may include, without limitation, email, Live Voice Phone Call, Short-Code Messaging Service (SMS), Interactive Voice Recording IVR, Web, Mobile Web, and Native Operating System Platform Application (iOS).

In some embodiments, the system and method for measuring concern resolution efficacy 100 may present the post concern resolution value on a website for consumer public viewing. The consumer public accessibility to the review information may allow the business to demonstrate concern resolution efficacy to consumers and build confidence with the consumer public. Those skilled in the art, in light of the present teachings, will recognize that the review information provides consumers with a more accurate reflection of overall and individual consumer sentiment about a product, service and/or business. By providing a post concern resolution score, users of the ratings and review data may be able to better understand 1) how the consumer felt about a product, service, and/or the business after the initiation of a concern resolution process, and 2) how well the responsible business entity responds to consumer issues that resulted in the negative rating and review of a product, service and/or business itself. Further, the business may utilize the post concern resolution results to improve product design, adjust services offerings, change operational processes and resolve other variables that result in negative reviews in an effort to provide an improved customer experience.

In one alternative embodiment of the present invention, the business may be reviewed by the consumer, not for the products or services, but for the concern resolution efficacy of the business. By providing a public forum for the concern resolution efficacy, the business may allow other consumers to discern the concern the business may have for the consumers. In some embodiments, the final value may be in printed form, and distributed to consumers and rating agencies, including, without limitation, Better Business Bureau, Consumer Reports, and Michelin Corp.

Figure 1B:
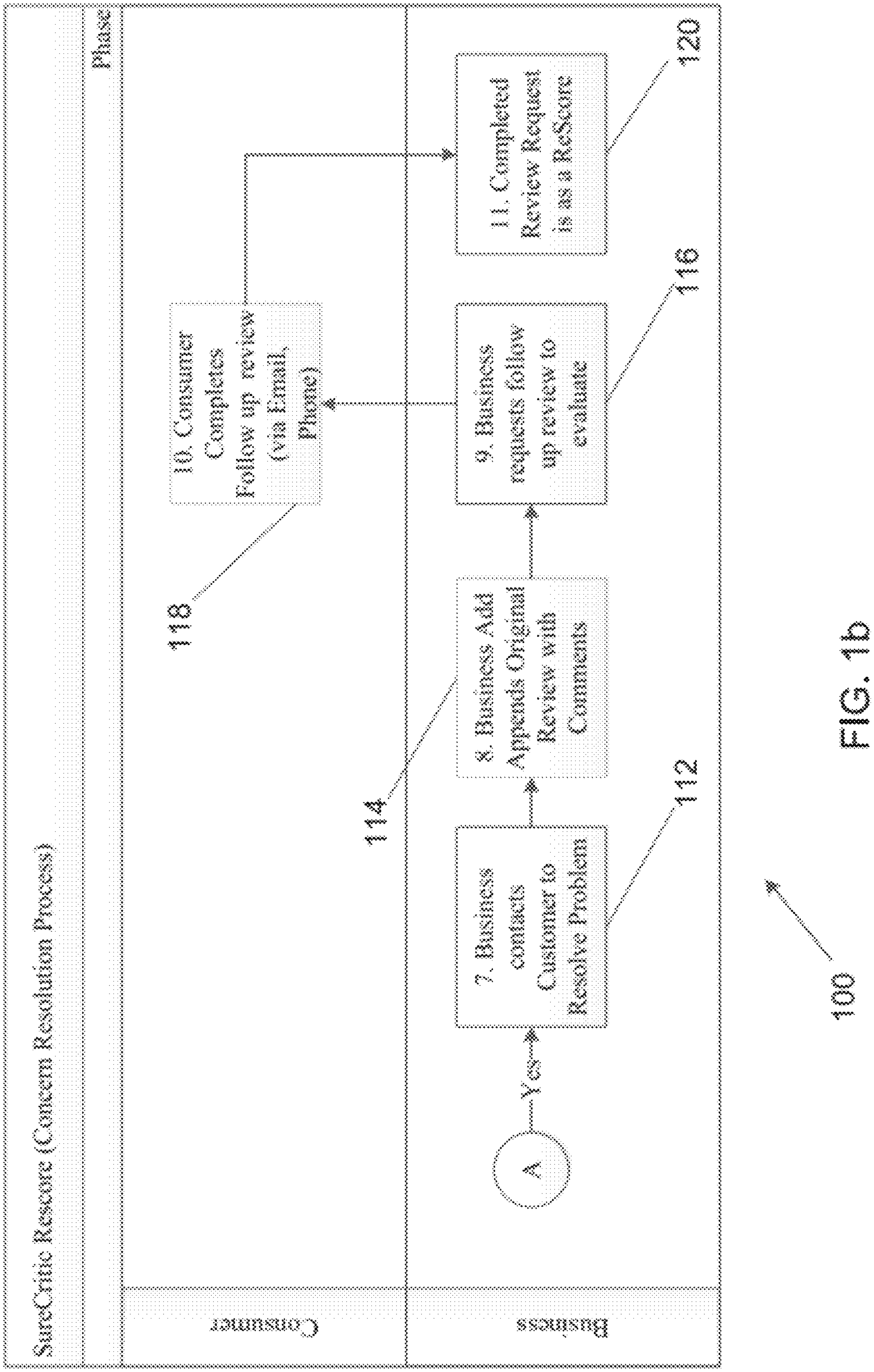

FIG. 1 illustrates an exemplary flowchart that illustrates a process for the system and method for measuring concern resolution efficacy 100, in accordance with an embodiment of the present invention. In the present embodiment, the process begins with an initial step 102 where the business may set a threshold of concern standard for the business. The business may decide what acceptable consumer satisfaction and dissatisfaction rating is. Those skilled in the art, in light of the present teachings will recognize that a cost and return analysis factor plays into the business decision of what level of consumer satisfaction is not acceptable, and how many resources the company may spend on concern resolution efficacy. A second step 104 involves the consumer purchasing the product or service from the business. The business recording the purchase into a point of sale device occurs in step 106. Next, in step 108, requesting a review or rating of the product or service occurs by the business. In step 110, the consumer responds by completing a review through numerous possible media, including without limitation, email, telephone, and survey card. If the review is below the threshold set by the business in step 102, the next step 112 involves the business contacting the consumer to resolve the problem. Necessary steps may be employed by the business to address the consumer concern. Also, the business may elucidate terms and conditions of the transaction in issue to verify that there truly was a problem, and not merely a misunderstanding. In step 114, the business continues the concern resolution efficacy by appending comments to the original review. In step 116, the business receives feedback on the concern resolution efficacy efforts by requesting feedback from the consumer in the form of a follow up review. The consumer concedes to the request by completing the follow up review in step 118. The follow up review may be completed through numerous media, including without limitation, email, telephone, and survey card. In step 120, the completed follow up review is compared with the initial review and may be presented as a Rescore.

An example of the process for the system and method for measuring concern resolution efficacy, as discussed above, may include, without limitation, the consumer may purchase goods/service from the business. Upon completion of the purchase, the consumer may be asked by the business to rate their experience or tell them how satisfied they were with that purchase experience. The consumer may provide an opinion in the form of a 1-5 star review rating, recommendations, and comments. If the sentiment of the opinion is negative and below the business concern resolution threshold, then the business may be alerted or prompted to take action to resolve the concern. Once the steps are taken to outline the concern and document them, the business initiates another request to measure the satisfaction of the consumer in resolving the concern by requesting a follow up review and appending business comments to the follow up review. Once the consumer completes the evaluation of the concern resolution by entering new rating and comments, the results may then be presented to the consumer public through a website.

Figure 2:
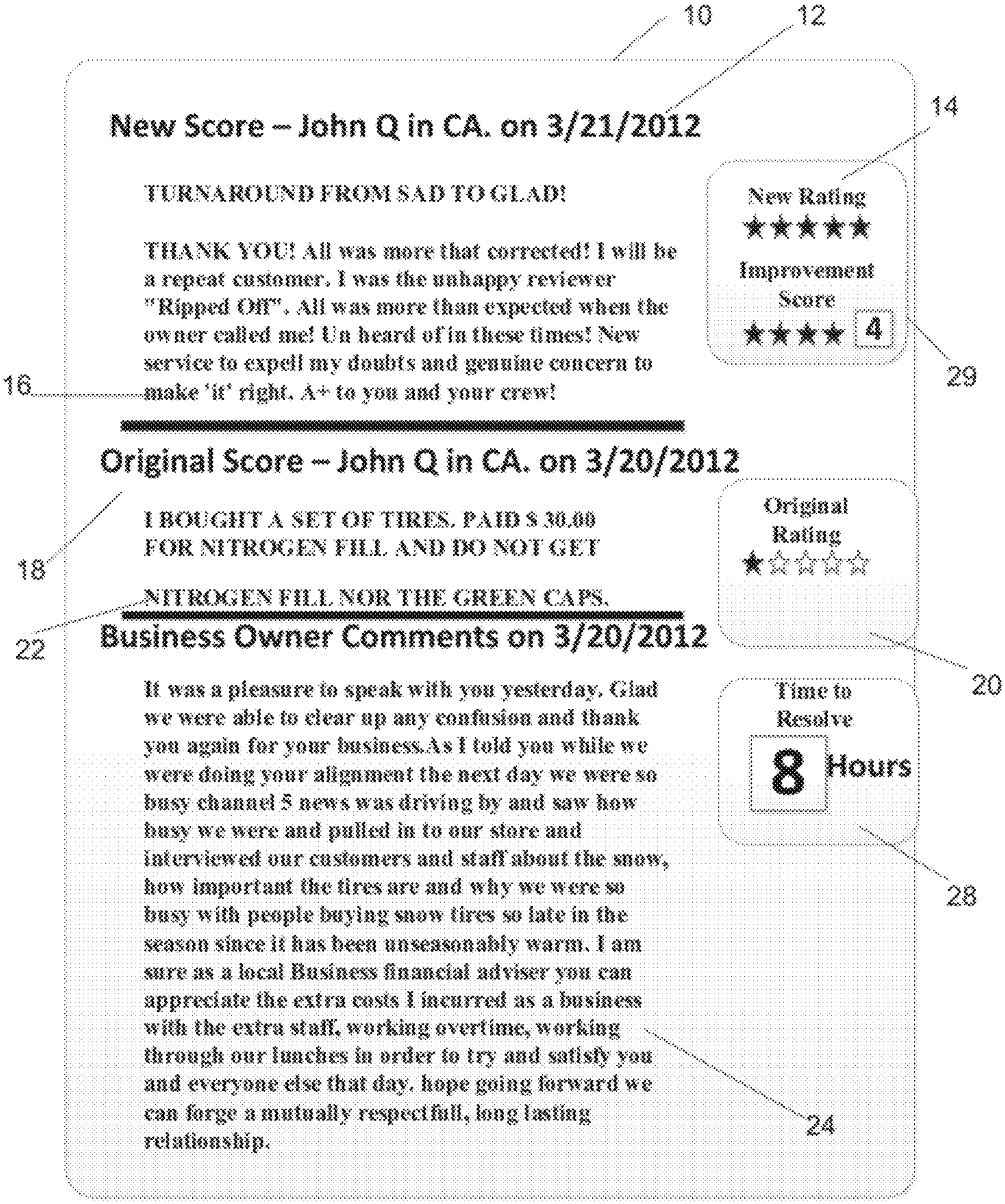
FIG. 2 illustrates an exemplary Individual Ratings and Review page that includes the original review, the follow up review, the concern resolution efficacy score, and the business comments, in accordance with an embodiment of the present invention.

FIG. 2 illustrates an exemplary Individual Ratings and Review page 10 that includes the original review 22, the follow up review 16, the concern resolution efficacy score 29, and the business comments 26, in accordance with an embodiment of the present invention. In the present embodiment, the Individual Ratings and Review page 10 provides a comparative display between the original review and the follow up review, and the difference between the two reviews. The Individual Ratings and Review page may be used to display and calculate the metrics from the original review and the follow up review for comparison analysis. The difference may reflect a measurement of the business' ability to resolve consumer concerns. In some embodiments, the Individual Ratings and Review page may include an original review details portion 18. The original review details portion may include the name of the consumer and the date that the consumer made the original review of the product or service. An original review rating 20 may include a rating system, including, without limitations, a star system, a point system, and a yes/no recommendation system. In some embodiments, the Individual Ratings and Review page may also include an original review 22 that details concerns that the consumer had with the product or service. For example, without limitation, the original review may state, "I bought a pair of tires. I paid $30 for nitrogen fill, and did not get nitrogen fill". In some embodiments, a business comments portion 24 provides information on the business, and may include a detailed assessment of how the business addressed the consumer concern. A time interval efficacy portion 28 may display the time interval for resolving the consumer concern. Those skilled in the art, in light of the present teachings, will recognize that time may be of an essence when addressing the consumer concern. If too much time lapses without a resolution, the consumer may conduct transactions with a different business.

In some embodiments, the Individual Ratings and Review page may include a follow up review details portion 12. The follow up review details portion may include the name of the consumer and the date that the consumer made the follow up review of the product or service. A follow up rating portion 14 provides the rating that the consumer gives the business after concern resolution. The follow up rating portion may also include the difference in ratings between the original rating and the follow up rating to provide a concern resolution efficacy score 29, which may give an indication of the business ability to resolve consumer concerns.

Figure 3:
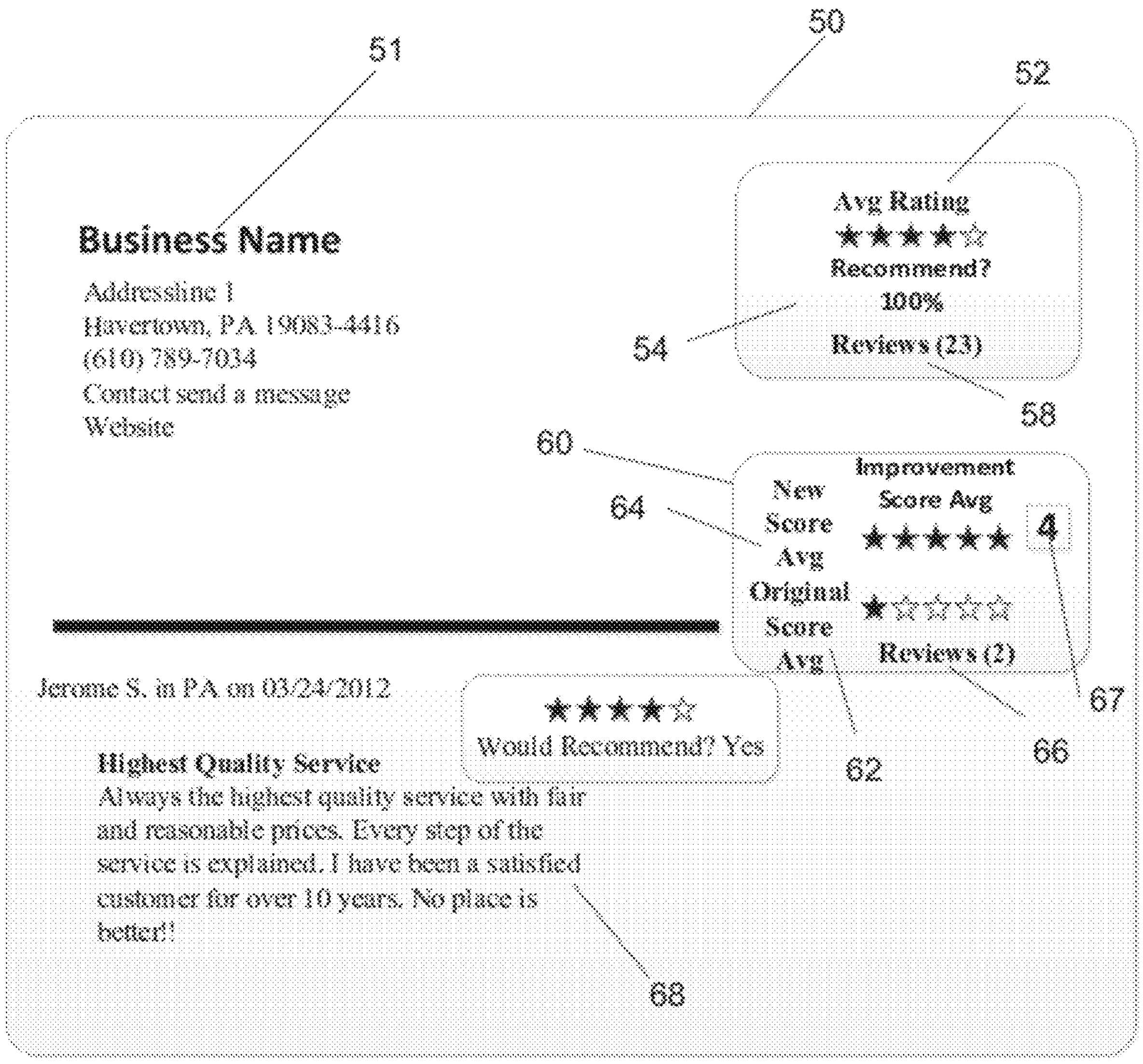
FIG. 3 illustrates an exemplary Business Ratings and Review page that includes business details, average ratings, a ratings portion, and a consumer comment portion, in accordance with an embodiment of the present invention.

FIG. 3 illustrates an exemplary Business Ratings and Review page 50 that includes business details 51, average ratings 54, a ratings portion 67, and a consumer comment portion 68, in accordance with an embodiment of the present invention. In the present embodiment, the Business Ratings and Review page provides a snapshot of how the business is performing with concern resolution efficacy. The Business Ratings and Review page may be used to display and calculate the metrics from the original review and the follow up review for comparison analysis. The business may utilize the information on the Business Ratings and Review page to further refine the concern resolution efficacy system and method. The Business Ratings and Review page may include a business details portion 51 for describing aspects of the business, including, without limitation, the business name, business contact information, and years the business has conducted transactions. In some embodiments, the Business Ratings and Review page may also include an average review portion 52. The average review portion may indicate the ratings that a multiplicity of consumers has given the business over a predetermined quantity of time. In some embodiments, the average review may be indicated in stars, with one star indicating a negative review, and five stars indicating a positive review. An overall recommendation portion 54 may include a yes/no indication concerning the overall recommendation of the business from a multiplicity of consumers, or a formula for analyzing reviews. The standard for deciding whether the business receives a yes or a no may depend on the amount of stars indicated in the average review portion. Those skilled in the art, in light of the present teachings, will recognize that the overall recommendation may be based on a more complicated formula that factors in variables including, without limitation, the number of complaints the business receives, the average improvement of reviews, the type of business, and the number of consumers performing the review. In some embodiments, Business Ratings and Review page may include an average review quantity portion that shows the number of reviews the business may receive in a predetermined quantity of time.

In some embodiments, the Business Ratings and Review page may be named a SureCritic Business Review Page that displays a star rating improvement number for both individual ReScores and an average for all ReScores.

In some embodiments, the Business Ratings and Review page may include a concern resolution efficacy portion 60 that includes information about the improvement between the original review and the follow up review. The concern resolution efficacy portion may include, without limitation, an original score average portion 62 that shows an average of what the business was receiving from consumers on for the original reviews. In some embodiments, the concern resolution efficacy portion may also include a new score average portion 64 that shows the average ratings for the follow up reviews. The average ratings provide for a quick visual analysis of the improvement or lack thereof in reviews or ratings for the business. A review quantity portion 66 may show how many consumers performed follow up reviews on the product or service. A rating portion 67 may indicate a numeral indicative of the overall rating of the business. In some embodiments, a consumer comment portion 68 may include an exemplary consumer, displaying the consumer name, date of the comment, the comment, and a consumer overall recommendation. For example, without limitation, Jerome S. in Pennsylvania on Mar. 24, 2012 stated, "Always the highest services with fair and reasonable prices.", and gave a four star rating to the business. In some alternative embodiments, the business may provide the business review page to media outlets, including, magazines, newspapers, radio, and television reporters to highlight the capacity of the business to resolve consumer concerns.

In some embodiments, the system and method for measuring concern resolution efficacy may be performed through various channels including, without limitation, the internet and a website, the telephone, and mail. The concern resolution efficacy page, which gives the final resolution status of the business, may be visible online for the consumer public to view. In this manner, an online review measurement for the value of the concern resolution process may demonstrate to the consumer public how well the business resolves consumer concerns that originally generated a negative review.

Figure 4:
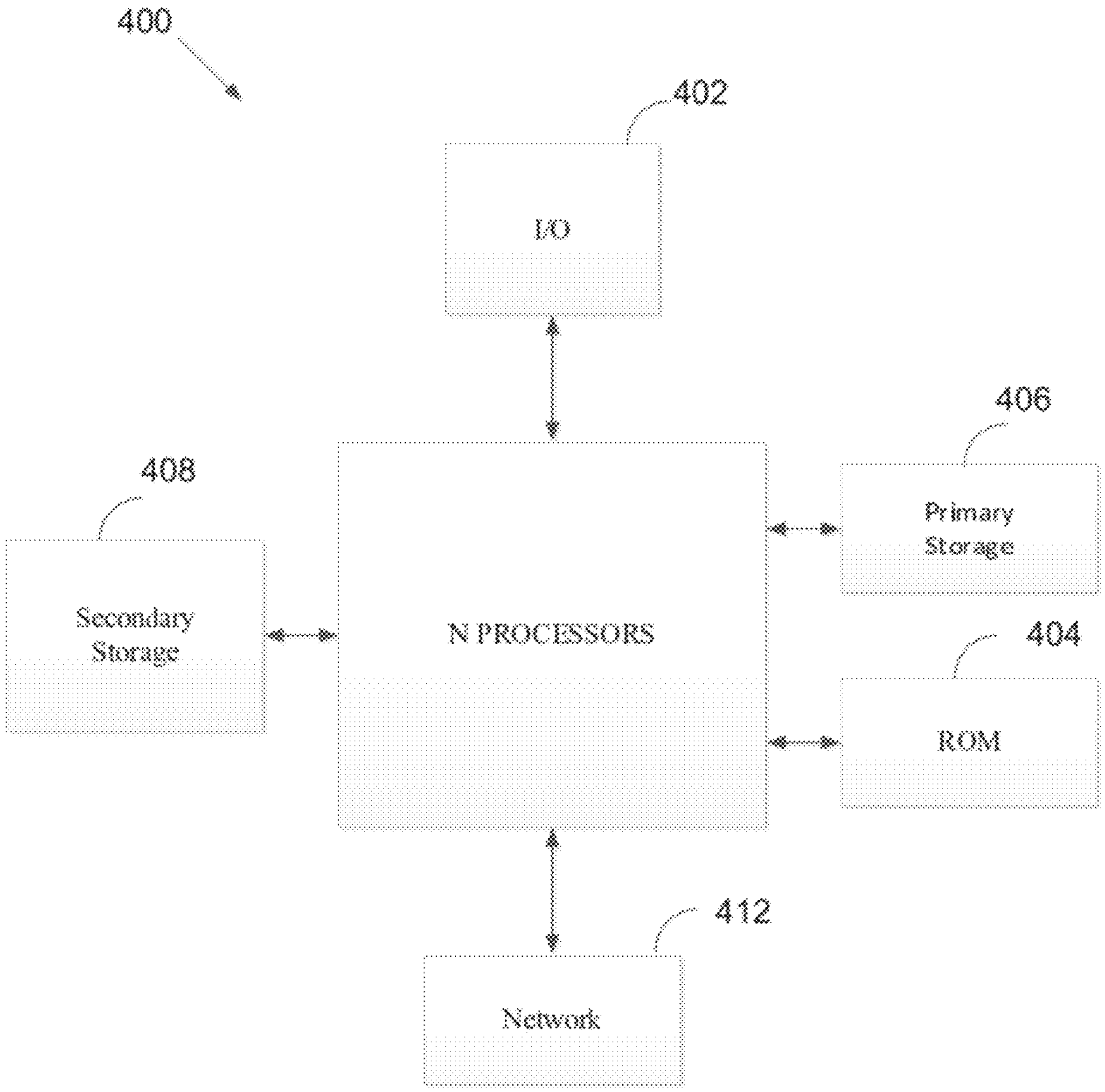
FIG. 4 illustrates a typical computer system that, when appropriately configured or designed, can serve as a computer system in which the invention may be embodied.

FIG. 4 illustrates a typical computer system that, when appropriately configured or designed, can serve as a computer system in which the invention may be embodied. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media such as those described above. A mass storage device 408 may also be coupled bi-directionally to CPU 402 and provides additional data storage capacity and may include any of the computer-readable media described above. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 may also be coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications or internet network using an external connection as shown generally at 412, which may be implemented as a hardwired or wireless communications link using suitable conventional technologies. With such a connection, it is contemplated that the CPU might receive information from the network, or might output information to the network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: the business's server; and server executed applications for processing reviews and appending and updating reviews.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing measuring customer satisfaction and applying a post concern resolution method and system according to the present invention will be apparent to those skilled in the art. Various aspects of the invention have been described above by way of illustration, and the specific embodiments disclosed are not intended to limit the invention to the particular forms disclosed. The particular implementation of measuring customer satisfaction and applying a post concern resolution method and system may vary depending upon the particular context or application. By way of example, and not limitation, the measuring customer satisfaction and applying a post concern resolution method and system described in the foregoing were principally directed to provide a post concern resolution rating and review score process that allows a business to accept ratings and reviews from a consumer, initiate some form of concern resolution activity, and finally post concern resolution rating and review from the consumer to generate a chronological picture of the resolution efficacy of the business; however, similar techniques may instead be applied to rating credit scores for individual borrowers, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A method for improving customer-facing information about a business through reviews by allowing the business to respond to negative reviews, the method comprising the steps of:

receiving at a server computer system a first review from a consumer at a client computer system of a product or service purchased by the consumer from the business, wherein the first review comprises responses of the consumer to multiple questions in the form of a Likert scale and the server computer system computes a first Likert score average of the responses;

recording at the server computer system the purchase of the product or service and the received first review, wherein the server computer system makes the received first review accessible to one or more potential customers of the business;

determining at the server computer system whether a sentiment of the first review is below a threshold level predetermined by the business to indicate the first review is negative for the business;

upon determining that the sentiment is below the threshold level, sending a communication to prompt an agent of the business to resolve one or more concerns of the consumer indicated by the first review;

receiving at the server computer system a concern resolution from the agent of the business, recording at the server computer system an outline of the concern resolution, wherein the server computer system makes the outline of the concern resolution accessible to one or more potential customers of the business;

communicating the concern resolution from the server computer system to the consumer at the client computer system, wherein the communication includes a solicitation for the consumer to submit a follow up review that measures satisfaction of the consumer based on the concern resolution;

receiving at the server computer system the follow up review from the consumer at the client computer system, wherein the follow-up review comprises responses from the consumer to multiple questions in the form of a Likert scale and the server computer system computes a second Likert score average of the follow-up responses;

recording at the server computer system the follow up review, wherein the server computer system makes the follow up review accessible to one or more potential customers of the business;

comparing the received first review with the received follow up review to create a concern resolution efficacy score that is a comparison of the first and second Likert score averages and that quantifies an ability of the business to resolve consumer concerns; and presenting the concern resolution efficacy score to one or more potential consumers of the business by making the concern resolution efficacy score publicly accessible to demonstrate concern resolution efficacy to potential consumers and build confidence with potential consumers, wherein the publicly accessible 1) first review, 2) concern resolution outline, 3) follow-up review, and 4) concern resolution efficacy score allows potential consumers to be able to better understand in one place how the user felt about a product, service, or business after the initiation of a concern resolution process and how well the business responds to customer issues, wherein the preceding steps are performed by one or more processors of the server and client computer systems.

2. The method as recited in claim 1, in which the first review and the follow up review each further comprise a numeric rating received from the consumer.

3. The method as recited in claim 1, in which the resolution information further comprises a time of completion of the concern resolution by the agent of the business.

4. The method as recited in claim 1, in which the server computer system further displays a metric of the business comprising a result of the concern resolution.

5. The method as recited in claim 1, in which the server computer system further displays a metric of the business comprising a result of the concern resolution, in which said metric comprises a difference between a numeric rating received from the consumer in the first review and a numeric rating received from the consumer in the follow up review.

6. The method as recited in claim 1, in which the server computer system further displays a metric of the business comprising a result of the concern resolution and an aggregation of reviews of the business across multiple purchases.

7. The method as recited in claim 1, in which the server computer system further displays a metric of the business comprising a result of the concern resolution and an average of reviews of the business across multiple purchases.

8. The method as recited in claim 1, in which the server computer system further displays a metric of the business comprising a result of the concern resolution and an aggregation of follow up reviews of the business across multiple purchases.

9. The method as recited in claim 1, in which the server computer system further displays a metric of the business comprising a result of the concern resolution and an average of follow up reviews of the business across multiple purchases.

10. A computer system for improving customer-facing information about a business through reviews by allowing the business to respond to negative reviews, the system comprising:

at least one processor and memory configured to execute software instructions embodied within the following components;

a review receiving component configured to receive at a server computer system a first review from a consumer at a client computer system of a product or service purchased by the consumer from the business, wherein the first review comprises responses of the consumer to multiple questions in the form of a Likert scale and the server computer system computes a first Likert score average of the responses;

a review recording component configured to record at the server computer system the purchase of the product or service and the received first review, wherein the server computer system makes the received first review accessible to one or more potential customers of the business;

a negative review detection component configured to determine at the server computer system whether a sentiment of the first review is below a threshold level predetermined by the business to indicate the first review is negative for the business;

a concern resolution component configured to, upon determining that the sentiment is below the threshold level, send a communication to prompt an agent of the business to resolve one or more concerns of the consumer indicated by the first review;

receive at the server computer system a concern resolution from the agent of the business, record at the server computer system an outline of the concern resolution, wherein the server computer system makes the received first review accessible to one or more potential customers of the business;

communicate the concern resolution from the server computer system to the consumer at the client computer system, wherein the communication includes a solicitation for the consumer to submit a follow up review that measures satisfaction of the consumer based on the concern resolution;

receive at the server computer system the follow up review from the consumer at the client computer system, wherein the follow-up review comprises responses from the consumer to multiple questions in the form of a Likert scale and the server computer system computes a second Likert score average of the follow-up responses; and record at the server computer system the follow up review, wherein the server computer system makes the follow up review accessible to one or more potential customers of the business;

compare the received first review with the received follow up review to create a concern resolution efficacy score that is a comparison of the first and second Likert score averages and that quantifies an ability of the business to resolve consumer concerns; and present the concern resolution efficacy score to one or more potential consumers of the business by making the concern resolution efficacy score publicly accessible to demonstrate concern resolution efficacy to potential consumers and build confidence with the potential consumers, wherein the publicly accessible: 1) first review, 2) concern resolution outline, 3) follow-up review, and 4) concern resolution efficacy score allows potential consumers to be able to better understand in one place how the user felt about a product, service, or business after the initiation of a concern resolution process and how well the business responds to customer issues.

11. The system as recited in claim 10, in which the review and the follow up review each further comprise a rating, the resolution information further comprises a time of completion of the concern resolution, and making the resolution information and follow up review accessible comprises presenting a website to customers of the business.

12. A non-transitory computer-readable medium comprising instructions for controlling a computer system to measure customer satisfaction and apply a post concern resolution process, wherein the instructions, upon execution, cause a processor to perform actions comprising:

receiving at a server computer system a first review from a consumer at a client computer system of a product or service purchased by the consumer from the business, wherein the first review comprises responses of the consumer to multiple questions in the form of a Likert scale and the server computer system computes a first Likert score average of the responses;

recording at the server computer system the purchase of the product or service and the received first review, wherein the server computer system makes the received first review accessible to one or more potential customers of the business;

determining at the server computer system whether a sentiment of the first review is below a threshold level predetermined by the business to indicate the first review is negative for the business:

upon determining that the sentiment is below the threshold level, sending a communication to prompt an agent of the business to resolve one or more concerns of the consumer indicated by the first review;

receiving at the server computer system a concern resolution from the agent of the business, recording at the server computer system an outline of the concern resolution, wherein the server computer system makes the outline of the concern resolution accessible to one or more potential customers of the business;

communicating the concern resolution from the server computer system to the consumer at the client computer system, wherein the communication includes a solicitation for the consumer to submit a follow up review that measures satisfaction of the consumer based on the concern resolution;

receiving at the server computer system the follow up review from the consumer at the client computer system, wherein the follow-up review comprises responses from the consumer to multiple questions in the form of a Likert scale and the server computer system computes a second Likert score average of the follow-up responses;

recording at the server computer system the follow up review, wherein the server computer system makes the follow up review accessible to one or more potential customers of the business;

comparing the received first review with the received follow up review to create a concern resolution efficacy score that is a comparison of the first and second Likert score averages and that quantifies an ability of the business to resolve consumer concerns; and presenting the concern resolution efficacy score to one or more potential consumers of the business by making the concern resolution efficacy score publicly accessible to demonstrate concern resolution efficacy to potential consumers and build confidence with potential consumers, wherein the publicly accessible: 1) first review, 2) concern resolution outline, 3) follow-up review, and 4) concern resolution efficacy score allows potential consumers to be able to better understand in one place how the user felt about a product, service, or business after the initiation of a concern resolution process and how well the business responds to customer issues.

13. The medium as recited in claim 12, in which the first review and the follow up review each further comprise a numeric rating.

14. The medium as recited in claim 12, in which the resolution information further comprises a time of completion of the concern resolution by the agent of the business.

15. The medium as recited in claim 12, in which the server computer system further displays a metric of the business comprising a result of the concern resolution.

16. The medium as recited in claim 12, in which the server computer system further displays a metric of the business comprising a result of the concern resolution, in which said metric comprises a difference between a numeric rating of the first review and a numeric rating of the follow up review.

17. The medium as recited in claim 12, in which the server computer system further displays a metric of the business comprising a result of the concern resolution and an aggregation of reviews of the business across multiple purchases.

18. The medium as recited in claim 12, in which the server computer system further displays a metric of the business comprising a result of the concern resolution and an average of reviews of the business across multiple purchases.

19. The medium as recited in claim 12, in which the server computer system further displays a metric of the business comprising a result of the concern resolution and an aggregation of follow up reviews of the business across multiple purchases.

20. The medium as recited in claim 12, in which the server computer system further displays a metric of the business comprising a result of the concern resolution and an average of follow up reviews of the business across multiple purchases.

* * * * *